United States Patent
Mei et al.

(10) Patent No.: US 8,334,233 B2
(45) Date of Patent: Dec. 18, 2012

(54) CATALYST LAYER-SUPPORTING SUBSTRATE, METHOD OF PRODUCING THE SAME AND FUEL CELL

(75) Inventors: Wu Mei, Yokohama (JP); Jun Tamura, Kawasaki (JP); Mutsuki Yamazaki, Yokohama (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 476 days.

(21) Appl. No.: 12/726,638

(22) Filed: Mar. 18, 2010

(65) Prior Publication Data

US 2010/0239950 A1    Sep. 23, 2010

(30) Foreign Application Priority Data

Mar. 19, 2009  (JP) ................................. 2009-068659

(51) Int. Cl.
*B01J 21/04* (2006.01)

(52) U.S. Cl. ............... 502/439; 502/527.14; 502/527.15

(58) Field of Classification Search .................. 429/487; 502/349, 527.14, 527.15
See application file for complete search history.

(56) References Cited

U.S. PATENT DOCUMENTS

| 4,126,934 A | 11/1978 | Richter et al. |
| 2008/0230171 A1 | 9/2008 | Mei et al. |
| 2010/0021787 A1 | 1/2010 | Wu et al. |

FOREIGN PATENT DOCUMENTS

| JP | WO02/073722 | 9/2002 |
| JP | 2007-507328 | 3/2007 |

*Primary Examiner* — Edward Johnson
(74) *Attorney, Agent, or Firm* — Oblon, Spivak, McClelland, Maier & Neustadt, L.L.P.

(57) ABSTRACT

A catalyst layer-supporting substrate includes a substrate and a catalyst layer. The catalyst layer includes a catalyst material and pores. The catalyst layer is formed on the substrate. The catalyst material has a layer or wire shape. A half-value width of a main peak of the catalyst material, as determined from X-ray diffraction spectrum of the catalyst layer, is 1.5° or more. A porosity of the catalyst layer is 30% or more.

15 Claims, 5 Drawing Sheets

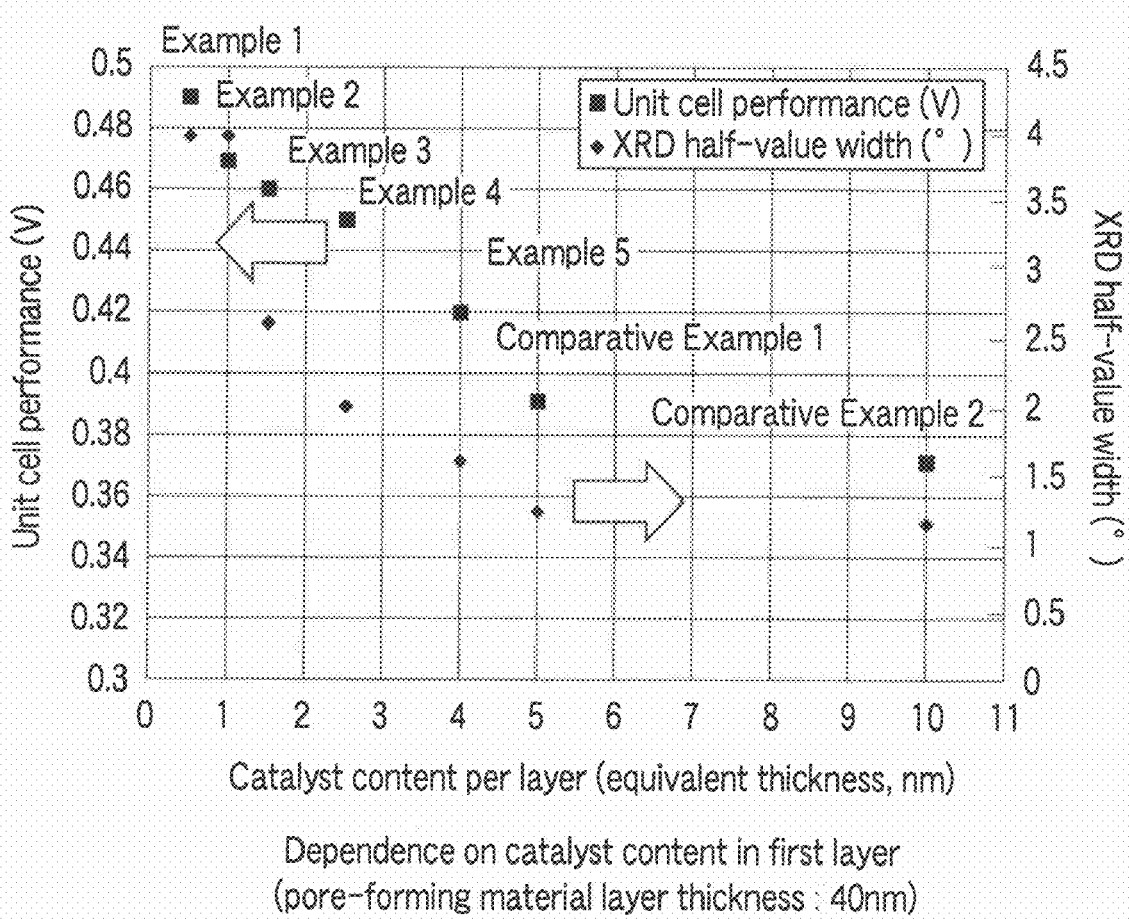
F I G. 6

US 8,334,233 B2

CATALYST LAYER-SUPPORTING SUBSTRATE, METHOD OF PRODUCING THE SAME AND FUEL CELL

CROSS-REFERENCE TO RELATED APPLICATIONS

This application is based upon and claims the benefit of priority from prior Japanese Patent Application No. 2009-068659, filed Mar. 19, 2009, the entire contents of which are incorporated herein by reference.

BACKGROUND OF THE INVENTION

1. Field of the Invention

The present invention relates to a catalyst layer-supporting substrate, a method of producing the catalyst layer-supporting substrate and a fuel cell.

2. Description of the Related Art

Polymer electrolyte fuel cells, in particular methanol-type polymer electrolyte fuel cells that use methanol solution as fuel and allow operation at low temperature and reduction in size and weight, have been studied eagerly as a power source of, for example, mobile devices. However, noble metal have been used as the main component of the catalyst materials for fuel cell electrodes, and thus, such electrodes are higher in cost and yet to be at the level allowing wide-spread use. There is a need for a technology to provide high fuel cell performance, by using a smaller amount of the noble metal catalyst material.

In the conventional method of production of electrodes for fuel cells, so-called catalyst layer-supporting substrates, slurry is prepared from a catalyst material, a proton conductor, a solvent and the like by mixing them. The slurry is then coated on a substrate. However, the method has a problem that the loss of the catalyst in the process is very large, approximately 30%.

Production methods by sputtering or vapor deposition have also been studied as a process in which the catalyst loss is decreased.

For example, WO2002/073722 reports that a catalyst layer is formed on a substrate by sputtering using a catalyst material and then a layer of particulate carbon is formed thereon. However, when a catalyst layer is prepared by the method, fine particles of the catalyst material aggregate significantly, causing a problem of insufficient utilization efficiency of the catalyst material.

Also reported is a method of forming a multilayer structure by sputtering using a catalyst material followed by formation of a Fe-containing metal layer by sputtering and then forming a porous structure in the catalyst layer by removing the Fe-containing metal layer in a pore-forming process (JP-A 2007-507328). Also reported is a method which comprises forming a catalyst layer and forming pores in the catalyst layer in the following pore-forming process (U.S. Pat. No. 4,126,934). The catalyst layer is formed by making an alloy of an easily soluble metal, so-called pore-forming metal, and a catalyst material, or sputtering or vapor deposition of the mixture thereof. However, both of the catalyst layers are still unsatisfactory in utilization efficiency and durability of the catalyst material and demand further improvement.

BRIEF SUMMARY OF THE INVENTION

According to a first aspect of the present invention, there is provided a method of producing a catalyst layer-supporting substrate, comprising:

forming a laminated body by stacking a first layer and a second layer alternately on a substrate;

the first layer comprising a catalyst material and being formed by sputtering or vapor deposition using the catalyst material, and the catalyst material content of the first layer is equivalent to a content of a flat layer consisting of the catalyst material and having a thickness of 0.3 nm or more and 4 nm or less; and the second layer comprising the pore-forming material and being formed by sputtering or vapor deposition using the pore-forming material, and an average thickness of the second layer is 10 nm or more and 500 nm or less; and forming pores by removing a pore-forming material in the second layers by solubilization.

According to a second aspect of the present invention, there is provided catalyst layer-supporting substrate comprising
a substrate; and
catalyst layer formed on the substrate;
wherein
the catalyst layer comprises a catalyst material and pores;
the catalyst material has a layer or wire shape;
a half-value width of a main peak of the catalyst material, as determined from X-ray diffraction spectrum of the catalyst layer, is 1.5° or more; and
a porosity of the catalyst layer is 30% or more.

According to a third aspect of the present invention, there is provided a fuel cell comprising an anode catalyst layer, a cathode catalyst layer and a proton-conductive membrane provided between the anode catalyst layer and the cathode catalyst layer, wherein one of the anode catalyst layer and the cathode catalyst layer is a catalyst layer of the above catalyst layer-supporting substrate.

BRIEF DESCRIPTION OF THE SEVERAL VIEWS OF THE DRAWING

FIG. 6 is a characteristic diagram showing the catalyst material content in a first layer, the half-value width of the main peak of the catalyst material, and the unit cell performance of the fuel cell using the catalyst layer according to some Examples.

DETAILED DESCRIPTION OF THE EMBODIMENT OF THE INVENTION

Figure 1A:
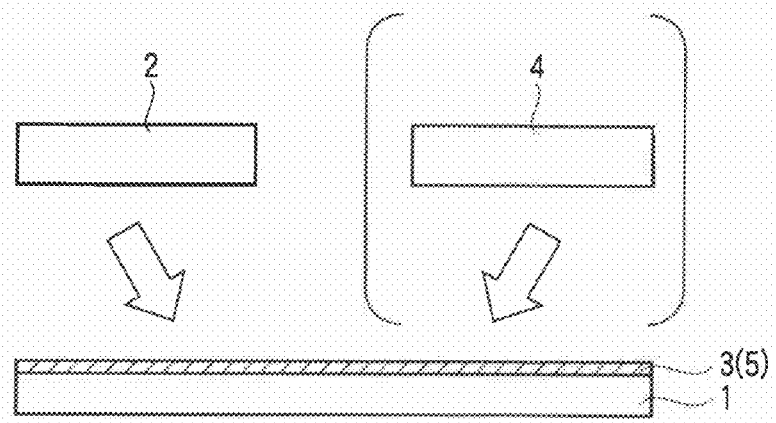
FIG. 1A is a schematic cross-sectional view illustrating a step of producing a catalyst-supporting substrate according to first embodiment.

In the specification, a layer which comprises a catalyst material is to be placed between a substrate and a proton-conductive membrane in a fuel cell membrane electrode assembly (MEA) will be referred to as a catalyst layer. The method of producing a catalyst layer-supporting substrate and the catalyst layer-supporting substrate in the present embodiment are specifically described below.

First, by sputtering or vapor deposition using a catalyst material, a layer containing the catalyst material (hereinafter, referred to as "first layer") is formed on a substrate (first step). The amount of the catalyst material per layer in the first layer at this time is preferably lower. Specifically, the amount of the catalyst material per layer in the first layer is preferably equivalent to a catalyst material content of a flat layer consisting of the catalyst material and having a thickness of 0.3 nm or more and 4 nm or less.

Then, by sputtering or vapor deposition using a pore-forming material, a pore-forming material layer (hereinafter, referred to as "second layer") is formed on the first layer (second step). At this time, the second layer is thicker than the first layer. Specifically, the average thickness of the second layer is 10 nm or more and 500 nm or less per layer.

Then, another first layer is formed on the second layer (third step) by sputtering or vapor deposition using a catalyst material.

The second and third steps are repeated alternately, to form a laminated body (stacking step).

The pore-forming material in the second layer present in the laminated body is then removed by solubilization (pore-forming step).

According to the production method, pores are formed in the catalyst layer on the substrate, as the pore-forming material in the second layer is removed by solubilization. Because of the pores therein, the catalyst material in the first layer has a thin-layered shape or a fine wire shape. Lamination of multiple first layers gives a catalyst layer having a structure in which the catalyst material is in the laminated structure or it is dispersed. It seems that, because the amount of the catalyst material contained in the first layer is small and the thickness of the second layer is thicker, the catalyst material contained in the first layer aggregates less easily with the catalyst material contained in the other laminated first layers. Then, the catalyst layer preferably has a half-value width of the main peak of the catalyst material, as determined from the X-ray diffraction spectrum of the catalyst layer, of 1.5° or more. And the catalyst layer preferably has a porosity of 30% or more.

Such a catalyst layer is more porous and the catalyst material has an extremely fine layer-shaped or wire shape, leading to increase in catalyst-utilizing efficiency. In addition, because the catalyst material in the layer or wire shape is present as it is separated by multiple pores, it is possible to suppress aggregation and growth of the catalyst material particles and improve the durability. In addition, the supply of fuel, the draining of products and the introduction of polymer proton conductor are more smoothly, leading to further increase in catalyst-utilizing efficiency. In fuel cell electrodes, the utilizing efficiency of the catalyst in the catalyst layer is strongly dependent on the density of the three-phase zone which is the fuel-catalyst-proton conductor interface. The catalyst layer above is preferable, from the point that there are many three-phase zones therein, because many pores are formed.

In forming the second layer, a first inorganic oxide is preferably used as the pore-forming material.

Further in forming the first layer, the catalyst material is preferably used together with a second inorganic oxide as the pore-forming material. Thus, the first layer comprises the catalyst material with the second inorganic oxide. Part of the inorganic oxide in the first or second layer is removed by solubilization, and pores are formed in the first or second layer, during the pore-forming treatment. On the other hand, the other part of the inorganic oxide in the first or second layer remains therein and it is dispersed in the catalyst layer obtained.

The first and second inorganic oxide may be the same or different from each other.

It seems that the presence of the second inorganic oxide in the catalyst layer is further effective in suppressing aggregation and growth of the catalyst material. The presence of multiple pores formed in the first layer suppresses aggregation and growth of the catalyst material and is also effective in smoothly supplying the fuel, draining the products and introducing the polymer proton conductor. In addition, a special interface is formed between the catalyst material and the element constituting the inorganic oxide contained in the first or second layer during forming the layer, and the special interface possibly provided proton conductivity. Such an interface smoothly conveys the protons generated in electrode reaction on the catalyst surface, possibly accelerating the electrode catalytic reaction and leading to improvement in catalyst material-utilization efficiency and durability.

Hereinafter, embodiments of the present invention will be described.

FIGS. 1A, 1B, 1C and 2 are schematic views explaining the method of producing a catalyst layer and the catalyst layer according to a first embodiment.

(First Step of Forming a First Layer)

First as shown in FIG. 1A, a catalyst material is coated on a substrate 1 by sputtering or vapor deposition using a catalyst material target 2, to form a catalyst material-containing first layer 3.

At this time, the amount of the catalyst material contained in each first layer is kept low. Specifically, the catalyst material content per layer in the first layer is preferably equivalent to a content of a flat layer consisting of the catalyst material and having a thickness of 0.3 nm or more and 4 nm or less. The layer thickness may vary, when molecules are distributed irregularly and the surface of the layer is not flat. The thickness of the flat layer means a thickness of a layer having catalyst material molecules distributed on the surface, as calculated by assuming that the entire mass of the layer is distributed uniformly on a plane having a projection area equal to the surface area of the layer. Herein after, the thickness of the flat layer is referred to as "thickness calculated as flat layer".

The catalyst material is loaded in the catalyst layer in sufficient quantity for obtaining high fuel cell performance. A layer having a thickness of less than 0.3 nm is still ineffective in suppressing aggregation and growth of the catalyst material. In addition, the number of layers of the first layer is also increased to obtain sufficient quantity of the catalyst material, which may lead to increase in cost of the production process. On the other hand, a layer having a thickness of more than 4 nm results in uncontrolled aggregation and growth of the catalyst material, which may lead to deterioration in catalyst-utilizing efficiency.

As described above, the catalyst material content per layer is defined, by using thickness calculated as flat layer. It is also possible to calculate the weight of the catalyst material contained in the catalyst layer unit area, from thickness calculated as flat layer and the specific gravity of the catalyst material. It is also possible to determine the catalyst material content per layer by measuring the weight of the catalyst in the entire catalyst layer by chemical composition analysis and dividing the weight by the number of the stacked catalyst layers. In the embodiment of the present invention, the catalyst material content per layer, as determined from thickness calculated as flat layer, is confirmed to be equal to the value obtained by chemical composition analysis.

In the first step, a mixed layer 5 comprising a catalyst material and a second inorganic oxide is preferably formed as the first layer, by co-sputtering or simultaneous vapor deposition using the catalyst material target 2 and a second inorganic oxide target 4. In this case, a multi-element alloy target comprising the catalyst material and the metal oxide may be used.

When the first layer 3 comprises a second inorganic oxide and a catalyst material, part of the inorganic oxide is dissolved and other part thereof remains after the pore-forming treatment. Thus, fine pores are formed and fine inorganic oxide particles are dispersed in the first layer. Thus, the effect of suppressing aggregation and growth of the catalyst material particles, accelerating supply and discharge of the fuel and the reaction products and accelerating introduction of the polymer proton conductor are magnified.

The amount of the second inorganic oxide per layer in the first layer is preferably equivalent to a content of a flat layer consisting of the second inorganic oxide and having a thickness of 0.5 nm or more 20 nm or less.

A layer having a thickness calculated as flat layer of less than 0.5 nm often results in insufficient suppression of aggregation and growth of the catalyst material. A layer having a thickness calculated as flat layer of more than 20 nm often leads to increase in entire electrode resistance. The thickness calculated as flat layer is more preferably 0.5 nm or more and 10 nm or less. The structure of the second inorganic oxide introduced into the first layer by sputtering or vapor deposition is almost amorphous. Part of the second inorganic oxide in the first layer is removed by the pore-forming treatment, but other part thereof remains therein. It is possible to adjust the structure and stability of the inorganic oxide by forming the layer under atmosphere containing oxygen and adjusting the oxygen content. In such a case, the partial oxygen pressure of the atmosphere during forming is preferably 1% or more and less than 10%. It is also possible to adjust the structure and the stability of the inorganic oxide by forming the layer under atmosphere containing nitrogen and adjusting the nitrogen content. In such a case, the partial nitrogen pressure of the atmosphere during forming is preferably 1% or more and less than 10%.

The substrate 1 can be used as a diffusion layer of the fuel cell electrode. Thus, a conductive substrate or a proton-conductive substrate may be used for the substrate 1.

The conductive substrate is preferably a porous conductive sheet. A sheet made of an air- or liquid-permeable material may be used for the porous conductive sheet. Examples thereof include a porous paper or cloth of carbon material, such as carbon cloth or carbon paper. In particular, a porous paper or cloth containing fibrous carbon is preferable. The porous conductive sheet is not limited thereto, and any support may be used, as long as it is a support superior in conductivity and stability. Porous conductive ceramics may be used as the materials for the conductive substrate.

Alternatively, without limitation, for example, a fluorine-based electrolyte membrane, a hydrocarbon-based electrolyte membrane, a super strong acidic mixed oxide membrane, or the like, may be used for the proton-conductive substrate. Any material may be used for the proton-conductive substrate material, as long as it is proton-conductive. When a catalyst layer is formed on a proton-conductive substrate, it is preferably to adjust the parameters, such as the substrate temperature during coating, by taking the thermal stability of the proton-conductive substrate material into consideration.

The catalyst material is preferably a material superior in catalytic activity, conductivity and stability, and examples thereof include noble metal-based catalysts. The noble metal-based catalyst is a catalyst using a noble metal element such as Pt, Ru, Rh, Os, Ir, Pd or Au. These noble metal elements are desirably used as alloys with other elements.

For example, an alloy having the composition represented by $Pt_y Ru_z T1_{1-y-z}$ may be used for the anodic catalyst material, wherein, $0.2 \leq y \leq 0.8$, $0 \leq z \leq 0.5$, and the element T1 is at least one element selected from the group consisting of W, Hf, Si, Mo, Ta, Ti, Zr, Ni, Co, Nb, V, Sn, Al and Cr.

Alternatively, for example, an alloy having the composition represented by $Pt_u T2_{1-u}$ may be used for the cathodic catalyst material, wherein, $0.2 \leq u \leq 0.75$, and the element T2 is at least one element selected from the group consisting of W, Hf, Si, Mo, Ta, Ti, Zr, Ni, Co, Nb, V, Sn, Al, Cr, Fe and Mn.

The catalyst material is not limited to a noble metal-based catalyst, and an oxide-based catalyst, a nitride-based catalyst, a carbide-based catalyst or the like may also be used.

The second inorganic oxide introduced into the first layer is preferably the oxide of at least one element selected from the group consisting of Zr, Ti, Ta, Ru, Si, Al, Sn, Hf, Ge, Ga, In, Ce, Nb, W, Mo, Cr, B and V. These oxides have stabilized effect to suppressing catalyst growth.

(Second Step of Forming a Second Layer)

Figure 1B:
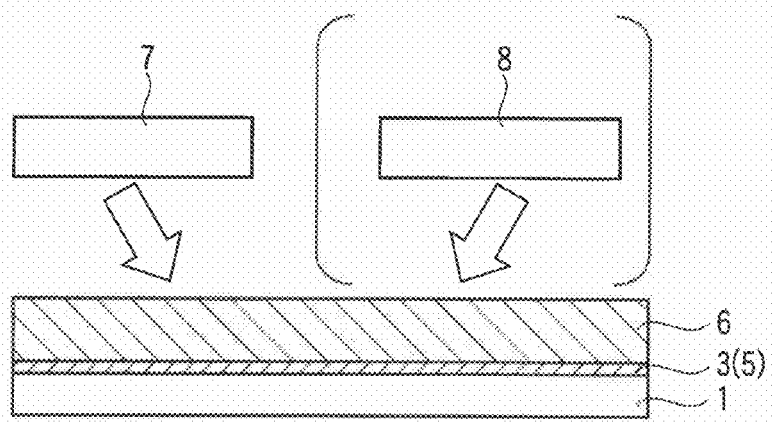
FIG. 1B is a schematic cross-sectional view illustrating a step of producing the catalyst-supporting substrate according to the first embodiment.

As shown in FIG. 1B, a pore-forming material is coated on the first layer 3 formed in the first step by sputtering or vapor deposition by using a pore-forming material target 7. A second layer 6 comprising the pore-forming material layer is formed in this way. The average thickness of the second layer 6 per layer is 10 nm or more and 500 nm or less. An average thickness of less than 10 nm leads to reduction in pore size and also reduction of the accelerating effect by presence of pores. An average thickness of more than 500 nm hardly leads to further reduction of the catalyst material aggregation-suppressing effect or porous structure-improving effect and also to increase in the cost of the production process. The average thickness is more preferably 15 nm or more and 200 nm or less and still more preferably 20 nm or more and 150 nm or less.

Most of the pore-forming material contained in the second layer 6 is finally removed for generation of pores in the catalyst layer. Thus, the pore-forming material may be any one that can be removed in a pore-forming step, for example by acid or alkali washing. A metal or a first inorganic oxide may be used as the pore-forming material, but the material is not limited thereto. First inorganic oxides are particularly preferred. Use of the first inorganic oxide results in solubilization of part thereof and replacement with pores in the pore-forming treatment, but some of it remains as fine oxide particles dispersed in the catalyst layer. In this way, aggregation and growth of the catalyst material particles can be suppressed. Both a metal and a first inorganic oxide may be used in combination.

When a metal is used as the pore-forming material, it is preferably at least one metal selected from Mn, Fe, Co, Ni, Zn, Sn, Al and Cu. These metals can be formed and removed in a short period of time and are thus advantageous from the point of production cost. Mn and Fe are considered to be superior in pore-forming efficiency, particularly in the case of acid treatment, and thus, Mn or Fe is preferably used alone. Mn or Fe, when used alone, gives a catalyst layer higher in porosity and improved in catalyst-utilizing efficiency. It is also possible to adjust the pore-forming efficiency, by using at least two metals elements, preferably at least one metal of Mn and Fe and at least one metal selected from Co, Ni, Zn, Sn and Al.

The second inorganic oxide used as the pore-forming material are preferably the oxide of at least one element selected from the group consisting of Zr, Ti, Ta, Ru, Si, Al, Sn, Hf, Ge, Ga, In, Ce, Nb, Mo, W, Cr, B and V. These oxides have a stabilized effect of suppressing catalyst growth.

Generally, the proton conductivity of an inorganic oxide has strong correlation with its solid acidity, and thus, the inorganic oxide having solid acidity is preferable. It is possible to provide proton conductivity at the interface between the inorganic oxide and the catalyst by introducing an inorganic oxide having solid acidity.

The first and second inorganic oxides having solid acidity may be a mixed inorganic oxide which comprises an inorganic oxide comprising at least one element Y selected from the group consisting of W, Mo, Cr, B and V (hereinafter, referred to as "Y oxide"), and a support supporting the Y oxide. The support comprises an inorganic oxide comprising at least one element X selected from the group consisting of Zr, Ti, Ta, Ru, Si, Al, Sn, Hf, Ge, Ga, In, Ce and Nb (hereinafter, referred to as "X oxide"). The accurate proton-conducting mechanism of the mixed inorganic oxides is yet to be understood, but when Y oxide, such as $WO_2$, $MoO_2$, or $V_2O_5$ is supported on the surface of X oxide support, such as $TiO_2$, $ZrO_2$, or $SnO_2$, Lewis acid sites are formed in the oxide structure. The Lewis acid sites, when hydrated, give Bronsted acid sites, generating a proton-conductive field. Alternatively, if the proton-conductive inorganic oxide has an amorphous structure, generation of the Lewis acid sites is considered to be accelerated.

The shape of the X oxide support may be particulate, fibrous, flat plate-shaped, layered, and porous or the like, but is not limited thereto. Because the surface of the X oxide support becomes the proton-conductive sites, it is preferable to use a nanometer-sized microparticulate oxide for increase of the proton-conductive sites. The Y oxide is preferably supported on at least part of the surface of the X oxide support, and may be present, for example, as scattered on the surface of the X oxide support as particles or as it covers the surface of the X oxide support as a layer. The Y oxide is particularly preferably in the particulate shape. The X oxide or the Y oxide may have any crystallinity, but the Y oxide is preferably amorphous. The Y oxide, when it is amorphous, may accelerate generation of Lewis acid sites, possibly contributing to increase in acidity and also leading to decrease in production cost and simplification of the production process.

It is possible to form an inorganic oxide layer, i.e., the second layer 6 comprising Y oxide particles supported on X oxide support on the first layer 3 formed in the first step, by sputtering using an inorganic oxide 7 comprising the element Y as a target and then sputtering using an inorganic oxide 8 comprising the element X as a target, and additionally by sputtering using the inorganic oxide 7.

The layer may be formed by co-sputtering or simultaneous vapor deposition of X and Y oxides. In this case, the layer shows super strong acidity and is improved in proton conductivity. Alternatively, a core-shell structure may also be formed, by co-sputtering of X and Y oxides and self-organizing of the two oxides. Yet alternatively, the mixed inorganic oxide layer may be formed by sputtering or vapor deposition by using a metal target of element X or Y in oxygen atmosphere.

Yet alternatively, a sulfuric acid-supporting metal oxide (see, for example, JP-A 2004-158261) may be used as the proton-conductive inorganic oxide.

It is possible to adjust the structure and the stability of the oxide, by adding oxygen to the atmosphere during sputtering or vapor deposition using an inorganic oxide. In this case, the partial oxygen pressure is preferably 1% or more and less than 10%. It is also possible to adjust the structure and the stability of the inorganic oxide by adding nitrogen to the atmosphere and adjusting the nitrogen content. In this case, the partial nitrogen pressure in the atmosphere during coating is preferably 1% or more and less than 10%.

In addition, carbon may be added to the second layer by sputtering or vapor deposition by using a pore-forming material and carbon simultaneously during forming of the second layer 6. The carbon is considered to have actions to suppress growth of catalyst material particles and form conductive paths. In addition, carbon shows almost no change in crystalline state after acid treatment. Addition of carbon is effective in forming a porous structure and improving the durability of the porous catalyst layer structure. The crystalline state of the carbon is not particularly limited. It is possible to form carbon in the amorphous or crystalline state, by changing the substrate temperature and the growth rate in the process of sputtering or vapor deposition. Crystalline carbon, when used, has an advantage that it is superior in conductivity and stability.

(Third Step of Forming the First Layer on the Second Layer)

Then, another first layer 3 is formed on the second layer 6 by sputtering or vapor deposition using the catalyst material target 2. In the third step, a mixed layer 5 comprising a catalyst material and a second inorganic oxide is preferably formed as the first layer, by co-sputtering or simultaneous vapor deposition using the catalyst material target 2 and a second inorganic oxide target 4.

(Repetition of Second and Third Steps)

Figure 1C:
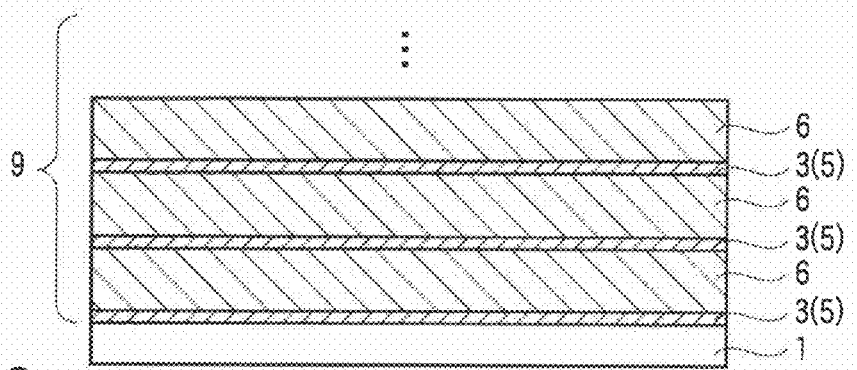
FIG. 1C is a schematic cross-sectional view illustrating a step of producing the catalyst-supporting substrate according to the first embodiment.

A laminated body 9 formed on a substrate which consisted of multiple first layers 3 comprising catalyst material and multiple second layers 6 comprising pore-forming material, as shown in FIG. 1C, is obtained by repeating the second and third steps plural times after the second step above.

Although an example of forming the first layer and then the second layer on the substrate 1 is shown in the present embodiment, the second layer may be formed first on the substrate 1 and the first layer formed thereon.

The numbers respectively of the first and second layers are preferably 5 or more and 1000 or less, for ensuring sufficient catalyst material content. When the number is 5 or more, it is possible to provide sufficiently high proton conductivity and durability and also improve the loading rate of the catalyst at the same time. Alternatively, when the number is 1000 or less, it is advantageously possible to reduce the cost of the process.

The rate of the sputtering or vapor deposition during forming each layer may be, for example, 0.5 to 100 nm/min. The substrate temperature during sputtering is preferably adjusted to 400° C. or lower. Higher temperature may lead to phase separation of the catalyst material particles and possible destabilization of activity of the catalyst material. In addition, the lowest substrate temperature is preferably set to 10° C., for reduction of the cost needed for cooling the substrate.

(Pore-Forming Step)

Figure 2:
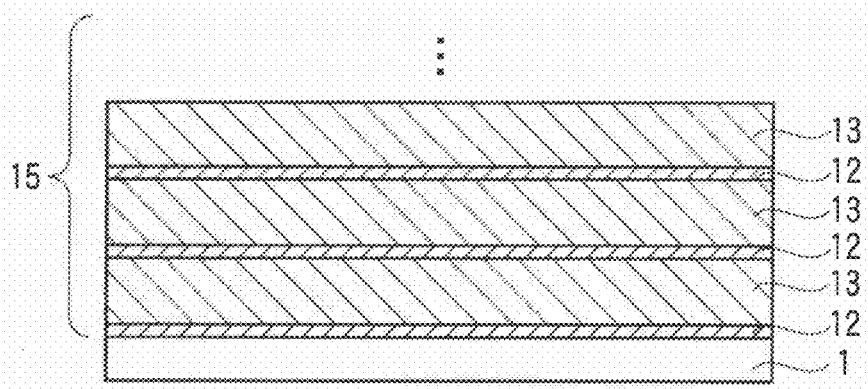
FIG. 2 is a schematic cross-sectional view illustrating a step of producing the catalyst-supporting substrate according to the first embodiment.

The laminated body 9 is then subjected to a pore-forming treatment. In the case of the laminated body 9 shown in FIG. 1C, the pore-forming material is removed from the first layer 3 and the second layer 6. The treatment gives a porous catalyst layer 15 having a porous structure, as shown in FIG. 2. In the catalyst layer 15, the first layer is a layer 12 comprising a catalyst material in the layer or wire shape, while the second layer is a porous layer 13.

The composition of multiple layers may be altered gradually, by controlling the composition of each layer during formation of the first and second layers. It is possible in this way to prepare a porous catalyst layer having a certain porosity gradient finally. Specifically, it is possible to raise the efficiency of using the catalyst material, for example, by increasing the catalyst material content and decreasing the porosity in the layers close to the substrate 1 and decreasing the catalyst material content in the layers more distant from the substrate 1.

If the first layer 3 comprises a second inorganic oxide, part of the inorganic oxide remains therein as dispersed. Even when a metal is used as the pore-forming material, part thereof may remain in the catalyst layer after the pore-forming step. The residual metal is converted to its oxide in reaction with oxygen in the atmosphere. The oxide is effective in suppressing growth of catalyst material particles and also in supplying fuel for the catalytic reaction. It seems that the oxide is effective in supplying water in the case of anode and supplying oxygen in the case of cathode.

The pore-forming treatment is desirably carried out by acid washing because it is easy, but is not limited thereto. Any process may be used, as long as it is a process giving a sufficiently porous structure. For example, the pores may be formed by washing with alkaline solution or by an electrolytic method.

For example, nitric acid, hydrochloric acid, sulfuric acid, or the liquid mixture thereof may be used for acid washing. The processing period may be about 5 minutes to 50 hours. The acid treatment may be carried out under heat at about 50 to 100° C. In addition, bias voltage may be applied for acceleration of solubilization of the pore-forming material in the catalyst layer or posttreatment such as heat treatment may be carried out, as needed.

Alternatively, a material that fixes the catalyst to the catalyst layer-supporting substrate may be added, to suppress release of the catalyst during the pore-forming treatment. For example, the catalyst layer-supporting substrate may be impregnated with a polymer solution such as Nafion solution and dried before the pore-forming treatment.

(Fine Structure of Catalyst Layer-Supporting Substrate)

In the present embodiment, a catalyst layer-supporting substrate after the pore-forming treatment will be described below.

The catalyst layer-supporting substrate in the present embodiment can be prepared by the production method in the present embodiment, but may be produced by any other method of giving such a structure.

The catalyst layer-supporting substrate has a catalyst layer formed on a substrate. In the catalyst layer, a catalyst material in the layer or wire shape is laminated or dispersed by pores. The catalyst material in the layer shape will be referred to also as a catalyst material layer. Alternatively, the catalyst material in the wire shape will also be called a catalyst wire. The shape of the catalyst material in the catalyst layer can be observed by transmission electron microscope (TEM). A catalyst material having a ratio of the length in the cross-sectional length direction to the length in the direction perpendicular thereto, i.e., aspect ratio, of 3 or more is defined as the catalyst material in the wire shape. In the production method of the present embodiment, the catalyst material is highly likely to be in the wire shape, when the catalyst material content per layer in the first layer is an amount equivalent to a layer having a thickness of 2 nm or less, when the layer consisting of the catalyst material is formed. The wire shape is preferable compared to the layer shape, a result of lower aggregation and growth of the catalyst material particles.

The catalyst-utilizing efficiency depends on the particle size of the catalyst material. It is possible to obtain high utilization efficiency by using a catalyst material smaller in size. In addition, the particle size of the catalyst material can be approximated by the half-value width of its X-ray diffraction peak. The half-value width of the X-ray diffraction peak depends strongly on the size of the catalyst particles, as shown in Scherrer equation, and catalyst materials having a large half-value width have smaller catalyst particles. In the present embodiment, the particle size of the catalyst material will be specified by using the half-value width of the X-ray diffraction peak of the catalyst material, as determined from the X-ray diffraction spectrum of the catalyst layer. In the X-ray diffraction spectrum, the half-value width of the main peak of the catalyst material is preferably 1.5° or more. Such a catalyst material is significantly resistant to aggregation and growth of the catalyst material particles and shows high catalyst-utilizing efficiency and durability. When the half-value width is less than 1.5°, the catalyst material is too large in particle size and does not have the sufficient action.

When the fine structure of the catalyst material is amorphous or when it is microcrystalline, wherein the particle grain size is 1 nm or less although it is crystalline, no distinct peak may be observed in its X-ray diffraction spectrum. The X-ray diffraction spectrum is the average of spectra of the catalysts contained in the catalyst layer, and thus, when amorphous and microcrystalline catalysts are present in greater amounts, the X-ray diffraction spectrum may not reflect the average of the entire catalysts present in the catalyst layer. In the embodiment, the X-ray diffraction peak may not be observed for a catalyst layer formed at catalyst material content per layer in the first layer of less than 1 nm. When no X-ray diffraction peak of a catalyst is observed, the half-value width of the main peak may be regarded to be unlimitedly large, i.e., regarded to be 1.5° or more.

In addition to the size of the catalyst material, the utilization efficiency of a catalyst material depends on the density of the three-phase boundaries formed by fuel, catalyst and proton conductor, and thus, pores are incorporated into the catalyst layer so that the three-phase boundaries are formed in an amount as much as possible. Thus, the porosity of the catalyst layer is preferably 30% or more. A porosity of less than 30% is not effective enough to suppress aggregation and growth of the catalyst material, leading to expansion of the catalyst size and thus, prohibiting high catalyst-utilizing efficiency. The porosity of the catalyst layer is particularly desirably 40% or more and 90% or less. A porosity of 90% or more hardly possibly leads to further decrease in catalyst aggregation-suppressing action and thus, to increase in the cost of the production process.

In the specification, the porosity was determined by the following formula:

$$\text{Porosity} = 1 - \frac{\text{(Pore-forming material atom content in the catalyst layer after pore-forming step} + \text{Catalyst atom content after pore-forming step)}}{\text{(Pore-forming material atom content in the catalyst layer before pore-forming step} + \text{Catalyst atom content before pore-forming step)}}$$

In the specification, the porosity of the catalyst layer is determined in the following manner: the compositions of a target catalyst layer-supporting substrate before and after pore-forming treatment are determined by ICP method and the porosity is calculated according to the formula above.

The catalyst layer preferably comprises inorganic oxide particles. Such a catalyst layer is highly resistant to aggregation and growth of the catalyst material particles and shows high catalyst-utilizing efficiency and durability. The average diameter of the inorganic oxide particles contained in the catalyst layer after pore-forming treatment is desirably 0.5 nm or more and 3 nm or less. An average diameter of more than 3 nm leads to increase in electrode resistance and possibly to instabilization of the properties of the fuel cell. An average diameter of less than 0.5 nm leads to decrease in the effect of the oxide fine particles present.

(Membrane Electrode Assembly and Fuel Cell)

The membrane electrode assembly (MEA) comprises an anode catalyst layer, a cathode catalyst layer, and a proton-conductive membrane placed between the anode and cathode catalyst layers. One of the anode and cathode catalyst layers is a catalyst layer of the catalyst layer-supporting substrate according to the embodiment of the present invention.

The fuel cell comprises the MEA described above, a fuel supplying unit for the anode, and an oxidant supplying unit for the cathode. It may comprise additionally a fuel cell channel plate and additionally a porous fuel-diffusing layer placed between the MEA and the fuel cell channel plate. The number of the MEAs comprised in the fuel cell may be one or more. Use of multiple MEAs gives larger electromotive force. For example, methanol, ethanol, formic acid or an aqueous solution comprising one or more selected therefrom may be used as the fuel.

Figure 3:
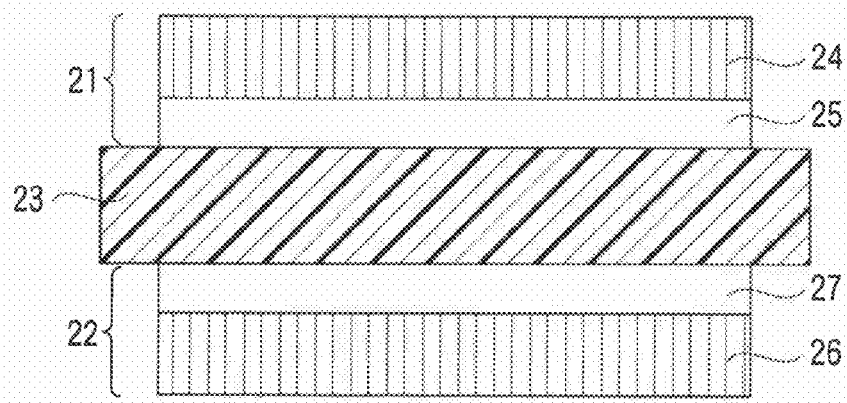
FIG. 3 is a schematic cross-sectional view illustrating a membrane electrode assembly according to second embodiment.

FIG. 3 is a schematic side view of the membrane electrode assembly (MEA) according to the present embodiment.

The MEA shown in FIG. 3 comprises an anode 21, a cathode 22 and a proton-conductive membrane 23. The anode 21 comprises a diffusion layer 24 and an anode catalyst layer 25 laminated thereon. The cathode 22 comprises a diffusion layer 26 and a cathode catalyst layer 27 laminated thereon. The anode catalyst layer 25 and the cathode catalyst layer 27 respectively of the anode 21 and the cathode 22 face each other, via the proton-conductive membrane 23.

In the present embodiment, the catalyst layer part of the catalyst layer-supporting substrate is used as the anode catalyst layer 25 and/or the cathode catalyst layer 27, and the substrate part thereof as the anode diffusion layer 24 and/or the cathode diffusion layer 26.

The proton-conductive membrane 13 is made of a proton-conductive substance that conveys protons. The proton-conductive substance may be a polymer substance, for example a fluororesin having sulfonic acid groups such as Nafion (manufactured by DuPont Inc.), Flemion (manufactured by Asahi Kasei K.K.) or Aciprex (manufactured by Asahi Glass K.K.), or an inorganic material such as tungstic acid or phosphortungstic acid, but is not limited thereto.

The catalyst-supporting substrate can be used for production of a membrane electrode assembly, as its catalyst layer part is laminated on the proton-conductive membrane. In such a case, a porous fuel-diffusing layer is placed between the membrane electrode assembly and the fuel cell channel plate. It is possible to obtain a fuel cell with higher performance, by controlling the porosity, water repellency, thickness and the like by adjustment of the structure of the porous fuel-diffusing layer.

The catalyst-supporting substrate can be applied to fuel cells using gas as its fuel, such as reformed gas type polymer electrolyte fuel cell.

In addition, the catalyst-supporting substrate is used favorably in MEMS-type fuel cells.

As described above in detail, the utilization efficiency of the catalyst material in the catalyst layer and also the durability of the catalyst layer can be improved. In addition, high-output fuel cells can be provided by using the same.

EXAMPLES

Hereinafter, Examples of the present invention will be described. The present invention is not limited to these Examples.

Examples 1 to 27 and 28 to 30

First Step

A carbon paper (trade name: Toray060) supporting a carbon layer having a thickness of 5 to 50 μm was used as the substrate. A first layer, i.e., a catalyst material-containing layer or a layer comprising a catalyst material and a inorganic oxide, was prepared by sputtering using a catalyst material target or a catalyst material target together with an oxide material target. The catalyst material content per layer in the first layer is an equivalent to a content of a flat layer consisting of the catalyst material and having a thickness of 0.3 to 4 nm. The inorganic oxide content per layer in the first layer is equivalent to a content of a flat layer consisting of the inorganic oxide and having a thickness of 0.5 to 20 nm. Table 1 summarizes the compositions of the first layers, the catalyst material contents per layer in the first layers, and the inorganic oxide contents per layer in the first layers, as expressed by the flat layer thickness.

Second Step

A second layer, i.e., a layer comprising a pore-forming material, was formed on the first layer by sputtering using a pore-forming material target. The average thickness per layer of the second layer is 10 nm or more and 500 nm or less. Table 1 summarizes the compositions and the thicknesses of the second layers.

Third Step

The first layer was formed by the same manner of the first step except that the first layer was formed on the second layer. (Lamination Step)

The second and third steps were repeated until the total amount of PtRu reached 1 mg/cm$^2$, to give a laminated body. (Pore-Forming Step)

The laminated body thus prepared was immersed in 10 wt % sulfuric acid at 80° C. for 2 hours for acid treatment. Then, the film was washed with purified water and dried, to give a catalyst layer-supporting substrate.

Comparative Examples 1 to 5, 7 and 8

Catalyst layer-supporting substrates were prepared in a manner similar to Examples above, except that the catalyst material content in the first layer and the average thickness of the second layer were changed from those of Examples 1 to 27. Table 1 summarizes the compositions of the first layers, the catalyst material contents therein, and the compositions and thicknesses of the second layers of Comparative Examples 1 to 5, 7 and 8.

Comparative Example 6

A carbon paper supporting a carbon layer having a thickness of 5 to 50 μm (trade name: Toray060) was used as the substrate. A first layer having a thickness of 10 to 300 nm and having a catalytic flat layer thickness of 10 nm was formed by the spraying method using a commercially available non-supported catalyst PtRu black (first step).

A second layer having a thickness of 1 to 100 nm was formed on the first layer by spraying with a first inorganic oxide prepared by the solution method (second step).

Another first layer was formed on the second layer by the same way of the first step.

The second and third steps above were repeated until the amount of PtRu reached 1 mg/cm². Then the laminated body was obtained.

The laminated body was immersed in 10 wt % sulfuric acid at 80° C. for 2 hours for acid treatment. The film was then washed with purified water and dried. Thus part of the proton-conductive inorganic oxide layer is removed to give a catalyst layer-supporting substrate which has a porous structure.

Table 1 summarizes the composition of the first layer, the catalyst material content therein and the composition and thickness of the second layer in Comparative Example 6.

[Evaluation of Substrate]

The catalyst layer in the laminated body obtained in each of Examples and Comparative Example was evaluated under a TEM. The catalyst layer in each Example was found to be a catalyst layer having a layer-shaped catalyst material and pores or a catalyst layer having a wire-shaped catalyst material and pores. In addition, the average diameter of the inorganic oxide particles contained in the catalyst layer was found to be 3 nm or less. Table 1 summarizes the particle diameters of the inorganic oxide particles. In addition, the compositions of each catalyst layer before and after pore-forming treatment were analyzed by ICP, for determination of the porosity. The catalyst layer after the pore-forming treatment was subjected to X-ray diffraction analysis (XRD, CuKα), and the half-value width of the main peak of the catalyst material was determined. The results are summarized both in the following Table 1.

In addition, a fuel cell electrode, a membrane electrode assembly and a unit cell were prepared by the methods described below for evaluation.

An anode comprising a noble metal catalyst at a loading density of 1 mg/cm² was prepared by using the catalyst layer-supporting substrate obtained in each of Examples 1 to 27. Some of the catalyst layer-supporting substrates of Examples 1 to 27 were impregnated with 5 wt % Nafion® (manufactured by DuPont Inc.) under vacuum and dried. In Table 1, those impregnated with Nafion® (manufactured by DuPont Inc.) were indicated by "O" and those not impregnated by "-" in the column of "Nafion impregnation".

An anode comprising a noble metal catalyst at a loading density of 1 mg/cm² was prepared by using the catalyst layer-supporting substrate obtained in each of Comparative Examples 1 to 6. Each catalyst layer-supporting substrate was impregnated with 5 wt % Nafion® (manufactured by DuPont Inc.) and dried.

A membrane electrode assembly and a fuel cell were prepared by using an anode prepared in Examples 1 to 20 or Comparative Examples 1 to 6 and a standard cathode comprising a Pt catalyst supported on carbon black (commercial product, manufactured by Tanaka Kikinzoku).

Separately, a cathode comprising a noble metal catalyst at a loading density of 1 mg/cm² was prepared, by using the catalyst layer-supporting substrate of each of Examples 28 to 30 prepared above. The substrates of Example 28 and 29 were impregnated with 5 wt % Nafion® (manufactured by DuPont Inc.) and dried. A cathode comprising a noble metal catalyst at loading density of 1 mg/cm² was prepared by using the catalyst layer-supporting substrate of each of Comparative Examples 7 and 8 prepared above. Each catalyst layer-supporting substrate was impregnated with Nafion® (manufactured by DuPont Inc.) and dried.

A membrane electrode assembly and a fuel cell were prepared by using a cathode of each of Examples 28 to 30 and Comparative Examples 7 and 8 and a standard anode comprising a PtRu catalyst supported on carbon black (commercial product, manufactured by Tanaka Kikinzoku).

The standard cathode was prepared in the following manner: 2 g of a Pt catalyst manufactured by Tanaka Kikinzoku was weighed. The Pt catalyst, 5 g of purified water, 5 g of 20% Nafion solution, and 20 g of 2-ethoxyethanol were dispersed under vigorous agitation, to give a slurry. The slurry was coated on a water-repellence-treated carbon paper (350 μm, manufactured by Toray Industries Inc.) with a control coater and dried, to give a cathode comprising a noble metal catalyst at a loading density of 1 mg/cm².

The standard anode was prepared in the following manner: 2 g of a PtRu catalyst manufactured by Tanaka Kikinzoku was weighed. The PtRu catalyst, 5 g of purified water, 8 g of 20% Nafion solution, and 20 g of 2-ethoxyethanol were dispersed under vigorous agitation, to give a slurry. The slurry was coated on a water-repellence-finished carbon paper (350 μm, manufactured by Toray Industries Inc.) with a control coater and dried, to give an anode comprising a noble metal catalyst at a loading density of 1 mg/cm².

In addition, in Comparative Example 9, a membrane electrode assembly and a fuel cell were prepared by using the standard anode and the standard cathode. The evaluation results are summarized in Table 1. The standard anode and the standard cathode were evaluated by XRD and TEM observation, not showing presence of a catalyst layer having a layer-shaped catalyst material and pores or a catalyst layer having a wire-shaped catalyst material and pores.

Details of the methods of producing the membrane electrode assembly and the fuel cell by using each electrode will be described below.

<Preparation of Membrane Electrode Assembly>

Each of the cathode and the anode was cut into a 3.2×3.2 cm square electrode having an electrode area of about 10 cm². Nafion 117 (manufactured by DuPont Inc.) was used as the proton-conductive solid polymer film. Nafion 117 (manufactured by DuPont Inc.) was placed between the cathode and the anode and it was subjected to thermocompression under heat at 125° C. at a pressure of 30 kg/cm² for 10 minutes, to give a membrane electrode assembly.

A unit cell of a direct-supply polymer electrolyte fuel cell was prepared by using the membrane electrode assembly prepared above and a channel plate. 1 M aqueous methanol solution was supplied to the anode as a fuel at a flow rate of 0.6 ml/minute and air was supplied to the cathode at a flow rate of 500 ml/minute, and the cell was discharged at a current density of 150 mA/cm² for 100 hours, while the cell was kept at 65° C., and then the cell voltage was measured. The results are summarized in the following Table 1. The cell voltage after power generation for 2000 hours was measured for evaluation of durability. The cells having a cell voltage drop rate of 2% or less, as compared to the cell voltage after 100 hours, were indicated by durability (⊚), those having a drop rate of 2 to 5%, by durability (◯) and those having a drop rate of 5% or more, by durability (Δ). The results are summarized in Table 1.

TABLE 1

| Example | First layer catalyst/inorganic oxide composition (atomic %) | First layer catalyst material content per layer (thickness calculated as flat layer nm) | First layer inorganic oxide content per layer (thickness calculated as flat layer nm) | Second layer thickness (nm) | Second layer composition |
|---|---|---|---|---|---|
| Example 1 | PtRu | 0.5 | — | 40 | Fe |
| Example 2 | PtRu | 1.0 | — | 40 | Fe |
| Example 3 | PtRu | 1.5 | — | 40 | Fe |
| Example 4 | PtRu | 2.5 | — | 40 | Fe |
| Example 5 | PtRu | 4.0 | — | 40 | Fe |
| Example 6 | PtRu | 1.5 | — | 10 | Fe |
| Example 7 | PtRu | 1.5 | — | 20 | Fe |
| Example 8 | PtRu | 1.5 | — | 80 | Fe |
| Example 9 | PtRu | 1.5 | — | 40 | Fe |
| Example 10 | PtRu0.3V0.2Zr0.1 | 1.5 | — | 40 | Fe |
| Example 11 | PtRu0.4W0.05Mo0.1 | 1.5 | — | 40 | Al |
| Example 12 | PtRu0.5V0.1Ta0.1Fe3 | 1.5 | — | 40 | Fe |
| Example 13 | PtRu0.3Ni0.1Si0.1 | 1.5 | — | 40 | Fe |
| Example 14 | PtRu0.4Sn0.1V0.1Nb0.1Zr0.1 | 1.5 | — | 40 | Fe |
| Example 15 | Pt2RuHf0.15Ta0.1 | 1.5 | — | 40 | Fe |
| Example 16 | PtRu/WO3 | 1.5 | 0.5 | 40 | Fe |
| Example 17 | PtRuFe3/SnO2 | 1.5 | 20 | 40 | Fe |
| Example 18 | PtRu0.4Ni0.1Si0.2/WO3 | 1.5 | 3 | 30 | Al |
| Example 19 | PtRu0.5W0.2Ti0.1/TiO2 | 1.5 | 3 | 40 | WO3 |
| Example 20 | PtRu0.1V0.1Zr0.1 | 1.5 | — | 40 | WO3/ZrO2 |
| Example 21 | PtRu0.3Hf0.1Nb0.1Fe2Mnl | 1.5 | — | 40 | MoO3/SnO2 |
| Example 22 | PtRu0.4V0.1Nb0.2Mn | 1.5 | — | 40 | CrO3/CeO2 |
| Example 23 | PtRu0.4V0.2Al0.1Fe2 | 1.5 | — | 40 | V2O5/SiO2 |
| Example 24 | PtRu0.3W0.1Cr0.2Fe2 | 1.5 | — | 40 | WO3/RuO2 |
| Example 25 | PtRu0.3W0.1Zr0.1Mn2 | 1.5 | — | 40 | WO3/Ta2O5 |
| Example 26 | PtRu0.35V0.2Cr0.2/SnO2 | 1.5 | 3 | 40 | WO3/HfO2 |
| Example 27 | PtRu0.3Hf0.2Si0.1/WO3 | 4 | 6 | 10 | BO3/GaO2 |
| Comparative Example 1 | PtRu | 5 | — | 40 | Fe |
| Comparative Example 2 | PtRu | 10 | — | 40 | Fe |
| Comparative Example 3 | PtRu | 1.5 | — | 8 | Fe |
| Comparative Example 4 | PtRu | 1.5 | — | 5 | Fe |
| Comparative Example 5 | PtRu | 10 | — | 5 | Fe |
| Comparative Example 6 | PtRu | 10 | — | 500 | WO3/TiO2 |
| Example 28 | Pt | 1.5 | — | 80 | Al |
| Example 29 | Pt | 1.5 | — | 80 | Fe |
| Example 30 | PtCo0.3Mn/WO3 | 1.5 | 3 | 40 | Al |
| Comparative Example 7 | Pt | 5 | — | 20 | — |
| Comparative Example 8 | Pt | 7 | — | 3 | Al |
| Comparative Example 9 | standard catalyst | — | — | — | — |

| Example | Catalyst layer XRD half-value width (°) | Size of inorganic oxide particles in catalyst layer (nm) | Porosity in the catalyst layer (%) | Nafion impregnation | Voltage (V) | Durability |
|---|---|---|---|---|---|---|
| Example 1 | >4* | — | 90 | ○ | 0.49 | ○ |
| Example 2 | 4 | — | 80 | ○ | 0.47 | ○ |
| Example 3 | 2.6 | — | 70 | ○ | 0.46 | ○ |
| Example 4 | 2 | — | 70 | ○ | 0.45 | ○ |
| Example 5 | 1.6 | — | 60 | ○ | 0.42 | ○ |
| Example 6 | 1.6 | — | 50 | ○ | 0.42 | ○ |
| Example 7 | 1.8 | — | 60 | ○ | 0.44 | ○ |
| Example 8 | 2.8 | — | 90 | ○ | 0.46 | ○ |
| Example 9 | 2.4 | — | 70 | — | 0.46 | ○ |
| Example 10 | 2.5 | — | 70 | ○ | 0.47 | ○ |
| Example 11 | 2.5 | — | 70 | ○ | 0.48 | ○ |
| Example 12 | 2.5 | — | 80 | ○ | 0.49 | ○ |
| Example 13 | 2.5 | — | 70 | ○ | 0.48 | ○ |
| Example 14 | 2.5 | — | 70 | — | 0.47 | ○ |
| Example 15 | 2.5 | — | 70 | — | 0.48 | ○ |
| Example 16 | 2.5 | <2 | 70 | — | 0.49 | ◎ |
| Example 17 | 2.5 | <2 | 75 | — | 0.49 | ◎ |
| Example 18 | 3.0 | <2 | 70 | — | 0.49 | ◎ |
| Example 19 | 2.5 | <2 | 70 | — | 0.54 | ◎ |
| Example 20 | 2.5 | <2 | 70 | — | 0.51 | ◎ |
| Example 21 | 2.5 | <2 | 70 | — | 0.52 | ◎ |
| Example 22 | 2.5 | <2 | 70 | ○ | 0.53 | ◎ |
| Example 23 | 2.5 | <2 | 70 | ○ | 0.54 | ◎ |
| Example 24 | 2.5 | <2 | 70 | — | 0.52 | ◎ |
| Example 25 | 2.5 | <2 | 70 | — | 0.52 | ◎ |
| Example 26 | 2.8 | <2 | 70 | — | 0.53 | ◎ |
| Example 27 | 1.9 | <2 | 30 | ○ | 0.42 | ◎ |
| Comparative Example 1 | 1.2 | — | 70 | ○ | 0.39 | Δ |

TABLE 1-continued

| | | | | | | |
|---|---|---|---|---|---|---|
| Comparative Example 2 | 1.1 | — | 60 | ○ | 0.37 | Δ |
| Comparative Example 3 | 1.0 | — | 50 | ○ | 0.35 | Δ |
| Comparative Example 4 | 0.9 | — | 60 | ○ | 0.33 | Δ |
| Comparative Example 5 | 0.9 | — | 25 | ○ | 0.28 | Δ |
| Comparative Example 6 | 0.9 | 5 | 30 | ○ | 0.28 | Δ |
| Example 28 | 2.5 | — | 80 | ○ | 0.42 | ○ |
| Example 29 | 2.3 | — | 80 | ○ | 0.49 | ○ |
| Example 30 | 2.8 | <2 | 80 | — | 0.50 | ◎ |
| Comparative Example 7 | 1.2 | — | 40 | ○ | 0.40 | Δ |
| Comparative Example 8 | 0.9 | — | 20 | ○ | 0.45 | Δ |
| Comparative Example 9 | 0.9 | — | 50 | ○ | 0.30 | Δ |

As obvious from Table 1, when the catalyst layer-supporting substrates of Examples 1 to 27 are compared with those of Comparative Examples 1 to 5 and 9 and also those of Examples 28 to 30 with those of Comparative Examples 7 to 9 respectively, the cells of Examples were higher in voltage and better in durability and fuel cell performance. Introduction of an oxide into the first layer or the pore-forming material layer resulted in improvement in fuel cell properties, especially in durability. In addition, introduction of a mixed oxide into the pore-forming material layer resulted in further improvement in properties. Further, the electrodes of Examples 9, 14 to 21, 24 to 26 and 30, which do not contain Nafion, also gave sufficient fuel cell performance. The results above show that the catalyst layer-supporting substrates prepared according to the present invention are proton-conductive.

In addition, comparison of Example 1 and Comparative Example 6 shows that the catalyst layer-supporting substrate of Example 1 is better in fuel cell performance than that of Comparative Example 6 which is produced by the spraying method. It is likely that a special interfacial structure formed between the catalyst layer and the oxide layer by sputtering leads to improvement in fuel cell performance.

Figure 4:
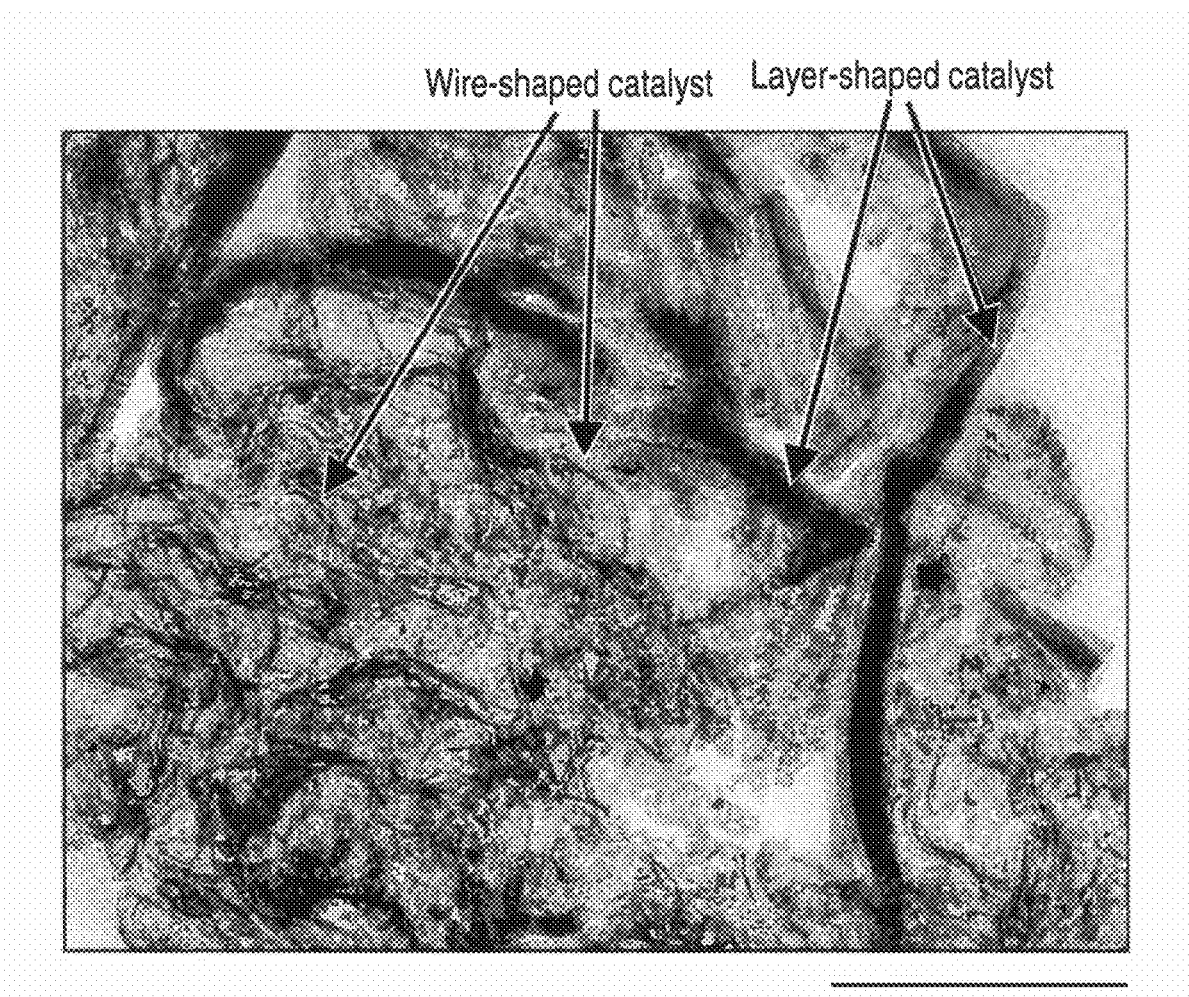
FIG. 4 is a TEM photograph showing the cross section of a catalyst layer of the catalyst-supporting substrate according to an Example.

FIG. 4 is a TEM micrograph showing the sectional view of the catalyst layer of Example 3. FIG. 4 shows that wire-shaped or fine layer-shaped catalyst materials are dispersed, as separated by pores, in the catalyst layer.

Figure 5:
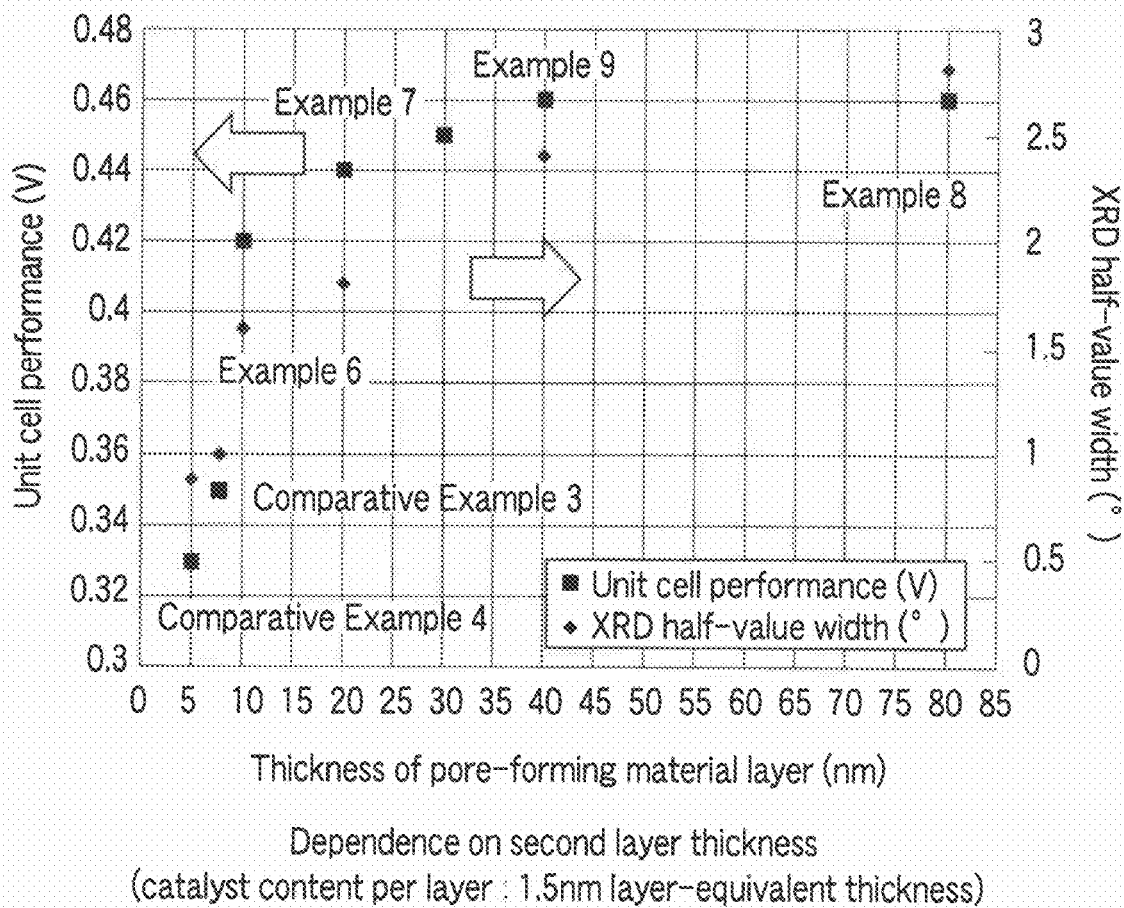
FIG. 5 is a characteristic diagram showing the thickness of a second layer prepared by using an inorganic oxide, the half-value width of the main peak of catalyst material in the catalyst layer and the unit cell performance of the fuel cell according to some Examples.

FIGS. 5 and 6 are graphs showing the properties of the cells of Examples 1 to 9 and Comparative Examples 1 to 4. FIG. 5 shows the thickness of the second layer comprising an inorganic oxide, the half-value width of the main peak of the catalyst material in the catalyst layer, and, the unit cell performance of the fuel cell prepared by using the catalyst layer. FIG. 6 shows the catalyst material content in the first layer, the half-value width of the main peak of the catalyst material, and the unit cell performance of the fuel cell prepared by using the catalyst layer. FIG. 5 shows that increase in thickness of the second layer leads to increase in the half-value width of the main peak of the catalyst material, decrease in crystal particle diameter, and thus, improvement in unit cell performance. Alternatively, FIG. 6 shows that decrease in catalyst material content per layer leads to increase in the half-value width of the main peak of the catalyst material, decrease in crystal particle diameter, and thus, improvement in unit cell performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a catalyst layer-supporting substrate, comprising:
    forming a laminated body on a substrate by alternately forming first layers and second layers,
        the forming further comprising forming the first layers by sputtering or vapor deposition with a catalyst material,
        a content of the catalyst material of which per first layer being equivalent to a content of a flat layer with a thickness of 0.3 nm or more and 4 nm or less which consist of the catalyst material solely, and
        the forming further comprising forming the second layers by sputtering or vapor deposition with a pore-forming material,
        an average thickness of which per second layer being 10 nm or more and 500 nm or less; and
    forming pores by removing the pore-forming material in the second layers by solubilization.

2. The method according to claim 1, wherein the pore-forming material comprises a first inorganic oxide.

3. The method according to claim 2, wherein the first inorganic oxide is an oxide of at least one element selected from the group consisting of Zr, Ti, Ta, Ru, Si, Al, Sn, Hf, Ge, Ga, In, Ce, Nb, W, Mo, Cr, B and V.

4. The method according to claim 2, wherein the first inorganic oxide is a mixed inorganic oxide, the mixed inorganic oxide comprises particles of Y oxide comprising at least one element Y selected from the group consisting of W, Mo, Cr, B and V, and a support of X oxide comprising at least one element X selected from the group consisting of Zr, Ti, Ta, Ru, Si, Al, Sn, Hf, Ge, Ga, In, Ce, Nb, W, Mo, Cr, B and V on which the particles are supported.

5. The method according to claim 1, further comprising:
    forming the first layers by sputtering or vapor deposition with a inorganic oxide together with the catalyst material,
    a content of the inorganic oxide of which per first layer being equivalent to a content of a flat layer with a thickness of 0.3 nm or more and 20 nm or less which consist of the inorganic oxide solely; and
    forming pores by removing the inorganic oxide in the first layers by solubilization.

6. The method according to claim 5, wherein the inorganic oxide is an oxide of at least one element selected from the group consisting of Zr, Ti, Ta, Ru, Si, Al, Sn, Hf, Ge, Ga, In, Ce, Nb, W, Mo, Cr, B and V.

7. The method according to claim 5, wherein the inorganic oxide is a mixed inorganic oxide, the mixed inorganic oxide comprises particles of Y oxide comprising at least one element Y selected from the group consisting of W, Mo, Cr, B and V, and a support of X oxide comprising at least one element X selected from the group consisting of Zr, Ti, Ta, Ru, Si, Al, Sn, Hf, Ge, Ga, In, Ce, Nb, W, Mo, Cr, B and V on which the particles are supported.

8. The method according to claim 1, wherein the laminated body has 5 layers or more and 1000 layers or less respectively of the first and second layers.

9. The method according to claim 1, wherein the catalyst material is an alloy comprising a noble metal element, and at least one element selected from the group consisting of W, Hf, Si, Mo, Ta, Ti, Zr, Ni, Co, Nb, V, Sn, Al, Cr, Fe and Mn.

10. A catalyst layer-supporting substrate comprising
a substrate; and
catalyst layer formed on the substrate;
wherein
the catalyst layer comprises a catalyst material and pores;
the catalyst material has a layer or wire shape;
a half-value width of a main peak of the catalyst material, as determined from X-ray diffraction spectrum of the catalyst layer, is 1.5° or more; and
a porosity of the catalyst layer is 30% or more.

11. The catalyst layer-supporting substrate according to claim 10, wherein the catalyst material is an alloy comprising a noble metal element, and at least one element selected from the group consisting of W, Hf, Si, Mo, Ta, Ti, Zr, Ni, Co, Nb, V, Sn, Al, Cr, Fe and Mn.

12. The catalyst layer-supporting substrate according to claim 10, wherein the catalyst layer comprises an inorganic oxide and the inorganic oxide is particles having an average diameter of 0.5 nm or more and 3 nm or less.

13. The catalyst layer-supporting substrate according to claim 12, wherein the inorganic oxide is an oxide of at least one element selected from the group consisting of Zr, Ti, Ta, Ru, Si, Al, Sn, Hf, Ge, Ga, In, Ce, Nb, W, Mo, Cr, B and V.

14. The catalyst layer-supporting substrate according to claim 12, wherein the inorganic oxide is a mixed inorganic oxide, the mixed inorganic oxide comprises particles of Y oxide comprising at least one element Y selected from the group consisting of W, Mo, Cr, B and V, and a support of X oxide comprising at least one element X selected from the group consisting of Zr, Ti, Ta, Ru, Si, Al, Sn, Hf, Ge, Ga, In, Ce, Nb, W, Mo, Cr, B and V on which the particles are supported.

15. A fuel cell comprising an anode catalyst layer, a cathode catalyst layer and a proton-conductive membrane provided between the anode catalyst layer and the cathode catalyst layer, wherein one of the anode catalyst layer and the cathode catalyst layer is a catalyst layer of the catalyst layer-supporting substrate according to claim 10.

* * * * *